United States Patent
Dolgov et al.

(10) Patent No.: US 9,342,074 B2
(45) Date of Patent: May 17, 2016

(54) SYSTEMS AND METHODS FOR TRANSITIONING CONTROL OF AN AUTONOMOUS VEHICLE TO A DRIVER

(71) Applicant: Google Inc., Mountain View, CA (US)

(72) Inventors: Dmitri Dolgov, Mountain View, CA (US); Andrew Schultz, Mountain View, CA (US); Daniel Trawick Egnor, Mountain View, CA (US); Christopher Urmson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/857,240

(22) Filed: Apr. 5, 2013

(65) Prior Publication Data
US 2014/0303827 A1    Oct. 9, 2014

(51) Int. Cl.
| G01C 22/00 | (2006.01) |
| G05D 1/00 | (2006.01) |
| B60W 30/00 | (2006.01) |

(52) U.S. Cl.
CPC ............. G05D 1/0061 (2013.01); B60W 30/00 (2013.01); G05D 2201/0213 (2013.01)

(58) Field of Classification Search
CPC ........................................... G05D 1/0061
See application file for complete search history.

(56) References Cited

U.S. PATENT DOCUMENTS

| 4,591,986 | A | * | 5/1986 | Nakajima et al. ................. 701/93 |
| 4,598,370 | A | * | 7/1986 | Nakajima et al. ................. 701/93 |
| 5,448,479 | A | * | 9/1995 | Kemner et al. ................... 701/23 |
| 5,469,356 | A | * | 11/1995 | Hawkins et al. ................. 701/48 |
| 5,684,696 | A | * | 11/1997 | Rao et al. ........................ 701/25 |
| 5,774,069 | A | * | 6/1998 | Tanaka et al. .................. 340/903 |
| 5,906,645 | A | | 5/1999 | Kagawa |
| 6,053,270 | A | * | 4/2000 | Nishikawa et al. ............ 180/168 |
| 6,152,255 | A | * | 11/2000 | Noro et al. ..................... 180/446 |
| 7,894,951 | B2 | * | 2/2011 | Norris et al. .................... 701/36 |

(Continued)

FOREIGN PATENT DOCUMENTS

JP     2011-131838     7/2011

OTHER PUBLICATIONS

2014 Mercedes-Benz S Class' Autonomous Steering Tested http://www.motorauthority.com/news/1080502_2014-mercedes-benz-s-class-autonomous-steering-tested Nov. 16, 2012 by Viknesh Vijayenthiran via Motor Authority.*

(Continued)

*Primary Examiner* — Jerrah Edwards
*Assistant Examiner* — Tommy Worden
(74) *Attorney, Agent, or Firm* — McDonnell Boehnen Hulbert & Berghoff LLP

(57) ABSTRACT

Methods and systems for adaptive methods for transitioning control to the driver are described. A computing device controlling a vehicle autonomously may be configured to receive a request for a transition of the vehicle from autonomous mode to manual mode through an indication by the driver. The computing device may determine the state of the vehicle based on parameters related to the autonomous operation of the vehicle. Based on the state of the vehicle and the indication, the computing device may determine instructions corresponding to the transition of control, which may include a strategy for the transition and duration of time corresponding to the transition of control. The computing device may provide the instructions to perform the transition of control of the vehicle from autonomous mode to manual mode.

17 Claims, 6 Drawing Sheets

(56) References Cited

U.S. PATENT DOCUMENTS

| | | | |
|---|---|---|---|
| 2006/0235615 A1 | 10/2006 | Kato et al. | |
| 2007/0198145 A1* | 8/2007 | Norris et al. | 701/23 |
| 2010/0286847 A1* | 11/2010 | Cerchie et al. | 701/2 |
| 2011/0071718 A1* | 3/2011 | Norris et al. | 701/23 |
| 2011/0190972 A1* | 8/2011 | Timmons et al. | 701/29 |
| 2012/0046817 A1* | 2/2012 | Kindo et al. | 701/23 |
| 2013/0002416 A1* | 1/2013 | Gazit | 340/438 |

OTHER PUBLICATIONS

CityMobil: Human Factor Issues Regarding Highly Automated Vehicles on eLane http://trb.metapress.com/content/nw97742515p88322/?genre=article&id=doi%3a10.3141%2f2110-01 Transportation Research Record: Journal of the Transportation Research Board vol. 2110 / 2009 Transit 2009 vol. 1 Dec. 4, 2009 by Toffetti et al.*

Transition to manual: Driver behaviour when resuming control from a highly automated vehicle http://www.sciencedirect.com/science/article/pii/S1369847814001284 Transportation Research Part F: Traffic Psychology and Behaviour, vol. 27, Part B Nov. 2014 by Merat et al.*

CityMobil: Human Factor Issues Regarding Highly Automated Vehicles on eLane http://repository.tudelft.nl/view/tno/uuid%3Ab5793d57-379f-475e-a9d1-5ca1f0134f2c/ TNO Innovation for Life, Repository hosted by TU Delft Library 2009 by Toffetti et al.*

International Search Report dated Aug. 6, 2014 in co-pending International Application No. PCT/US2014/032843; ISA/Korean International Property Office.

* cited by examiner

SYSTEMS AND METHODS FOR TRANSITIONING CONTROL OF AN AUTONOMOUS VEHICLE TO A DRIVER

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to adaptive methods for transitioning control to the driver in autonomous vehicles. In one aspect, the present application describes a method. The method may comprise receiving, via a computing device, an indication for a transition of control of a vehicle operating in an autonomous mode, and the computing device is configured to control the vehicle in the autonomous mode. The method may further comprise determining, by the computing device, a state of the vehicle based on at least one parameter related to operation of the vehicle in the autonomous mode. The method may also comprise based on the state of the vehicle and the indication, determining instructions corresponding to the transition of control of the vehicle from the autonomous mode to a manual mode of operation, and the instructions include information indicative of one or both of a strategy for the transition of control of the vehicle and a duration of time over which the transition of control of the vehicle from the autonomous mode to the manual mode of operation is configured to occur. The method may additionally comprise providing the instructions to perform the transition of control of the vehicle from the autonomous mode to the manual mode of operation.

In another aspect, the present application describes a non-transitory computer readable medium having stored thereon executable instructions that, upon execution by a computing device, cause the computing device to perform functions. The functions may comprise receiving, via a computing device, an indication for a transition of control of a vehicle operating in an autonomous mode, and the computing device is configured to control the vehicle in the autonomous mode. The functions may further comprise determining, by the computing device, a state of the vehicle based on at least one parameter related to operation of the vehicle in the autonomous mode. The functions may additionally comprise based on the state of the vehicle and the indication, determining instructions corresponding to the transition of control of the vehicle from the autonomous mode to a manual mode of operation, and the instructions include information indicative of one or both of a strategy for the transition of control of the vehicle and a duration of time over which the transition of control of the vehicle from the autonomous mode to the manual mode of operation is configured to occur. The functions may further comprise providing the instructions to perform the transition of control of the vehicle from the autonomous mode to the manual mode of operation.

In still another aspect, the present application describes a system. The system may comprise at least one processor. The system may also comprise a memory having stored thereon executable instructions that, upon execution by the at least one processor, cause the system to perform functions comprising receiving, via a computing device, an indication for a transition of control of a vehicle operating in an autonomous mode, and the computing device is configured to control the vehicle in the autonomous mode. The functions may further comprise determining, by the computing device, a state of the vehicle based on at least one parameter related to operation of the vehicle in the autonomous mode. The functions may additionally comprise based on the state of the vehicle and the indication, determining instructions corresponding to the transition of control of the vehicle from the autonomous mode to a manual mode of operation, and the instructions include information indicative of one or both of a strategy for the transition of control of the vehicle and a duration of time over which the transition of control of the vehicle from the autonomous mode to the manual mode of operation is configured to occur. The functions may further comprise providing the instructions to perform the transition of control of the vehicle from the autonomous mode to the manual mode of operation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
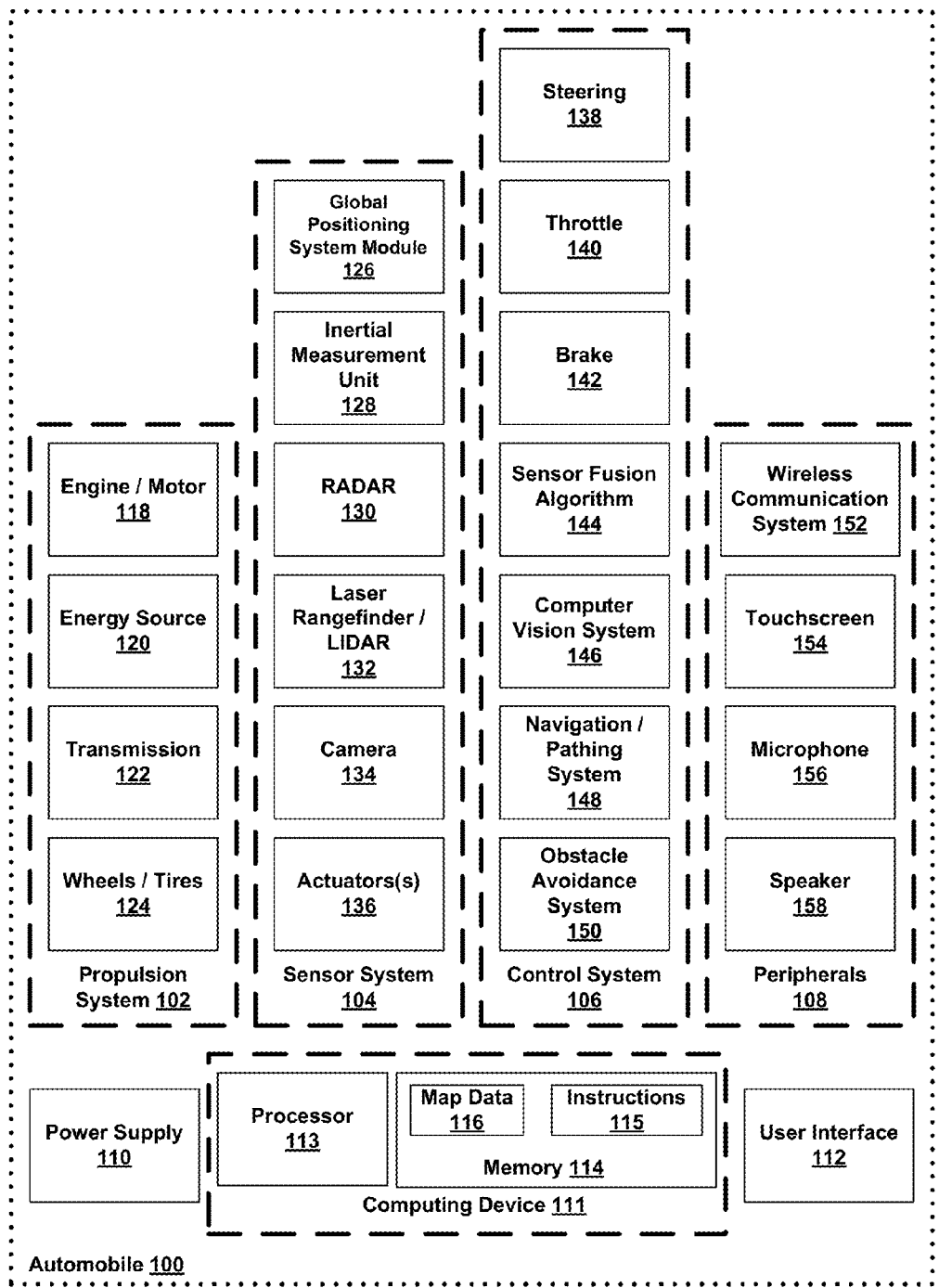
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a vehicle operating in autonomous mode may be configured to transition control to a driver. The vehicle may be configured to transition between autonomous mode and manual mode without interruption upon receiving an indication (e.g., from the driver) requesting control of the vehicle. A computing device, configured to control the vehicle in autonomous mode, may receive a request for control of the vehicle from the driver through various indications, such as an application of force to the steering wheel, throttle, or brakes by the driver.

Further, the computing device may determine a state of the vehicle based on parameters related to operation of the vehicle in the autonomous mode. The computing device may determine parameters such as information associated with the braking system, steering system, or throttle system of the vehicle. Additionally, the computing device may be configured to determine the speed or acceleration of the vehicle, current or upcoming turning angle of a steering system, the level of brakes being applied, or a combination of the various parameters. The state of a vehicle may include information related to recent and future traffic patterns, environmental obstacles, and near future actions of the vehicle. Based on the state of the vehicle and the indication, the computing device may be configured to determine instructions corresponding to the transition of control of the vehicle from autonomous mode to a manual or semi-manual mode of operation. The instructions may include a strategy for the transition of control of the vehicle and/or the duration of time for the transition of control to occur. Different parameters and types of indication from the driver may cause the computing device to determine different strategies for the transition of control of the vehicle and use varying durations of time for completing the transition. The computing device may provide the instructions to perform the transition of control of the vehicle from autonomous mode to the manual mode of operation and may further perform the instructions to execute the transition. Other entities may perform the instructions as well.

In some instances, the computing device may be configured to only perform a transition of control to the driver if the indication from the driver satisfies one or more thresholds. For example, the computing device may be configured to only transition the control to the driver if the detected amount of change in the steering system of the vehicle exceeds a threshold. By requiring a threshold amount, the computing device may confirm that the received indication was intended by the driver and not an accidental bump of the steering wheel or other cause of a slight change.

Additionally, the computing device may determine that an immediate transition of control to the driver from autonomous mode may not be safe and/or proper and therefore, not perform the handoff despite receiving a request from the driver. For example, the computing device may consider the state of the vehicle operating autonomously and determine that a transition may require too much immediate action from the driver, such as handing off control during the middle of a sharp turn or while the vehicle is maneuvering around an object in the road, etc. Further, the computing device may determine that the type of indication received from the driver is not an appropriate indication for transitioning control based on the state of the vehicle operating autonomously. For example, if the computing device detects an indication of applied force to steering wheel by the driver for control, but the vehicle is currently operating at a high speed, the computing device may deny transitioning control to the driver since executing an immediate turn at a high speed may be unsafe.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS)

module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
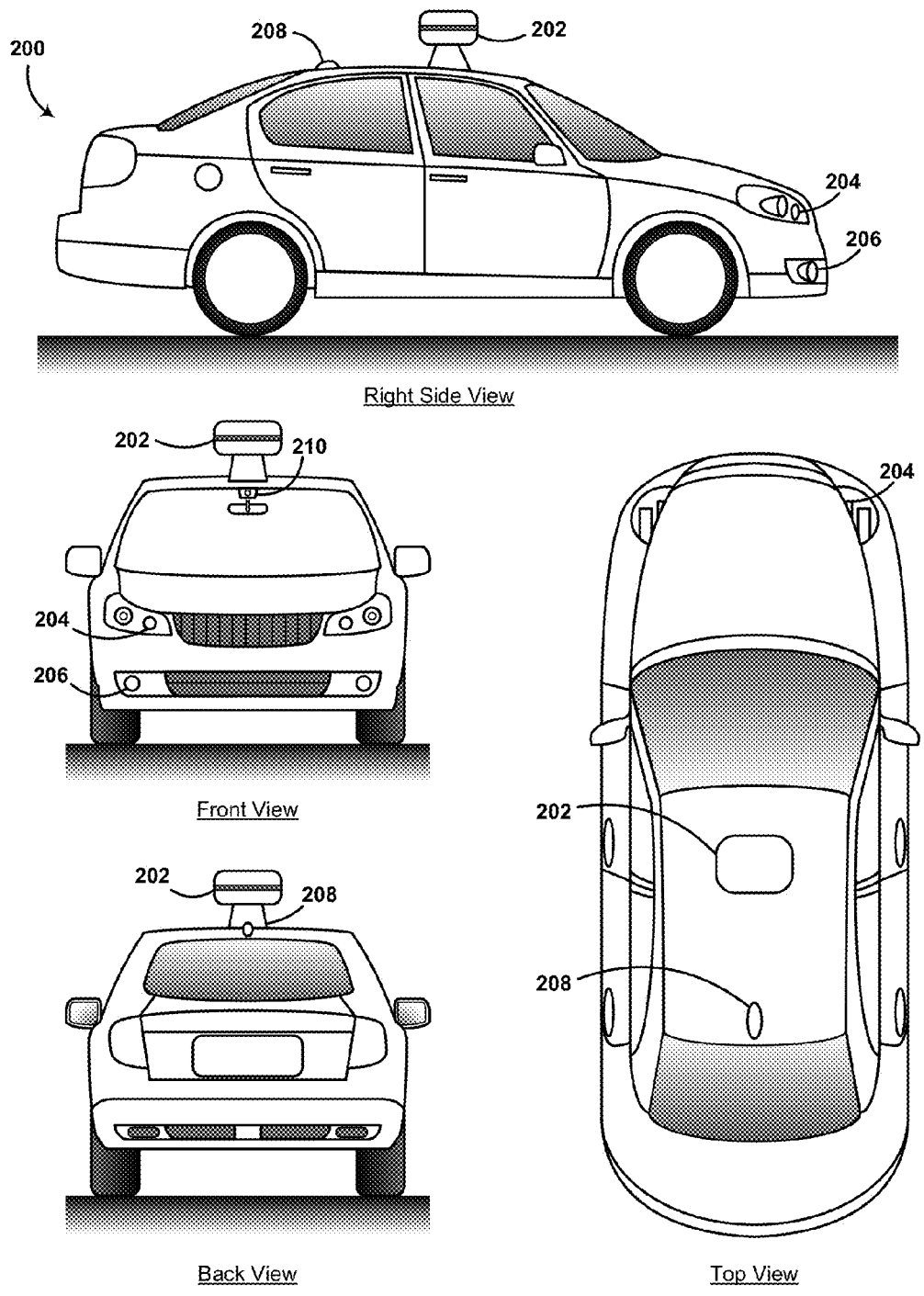
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
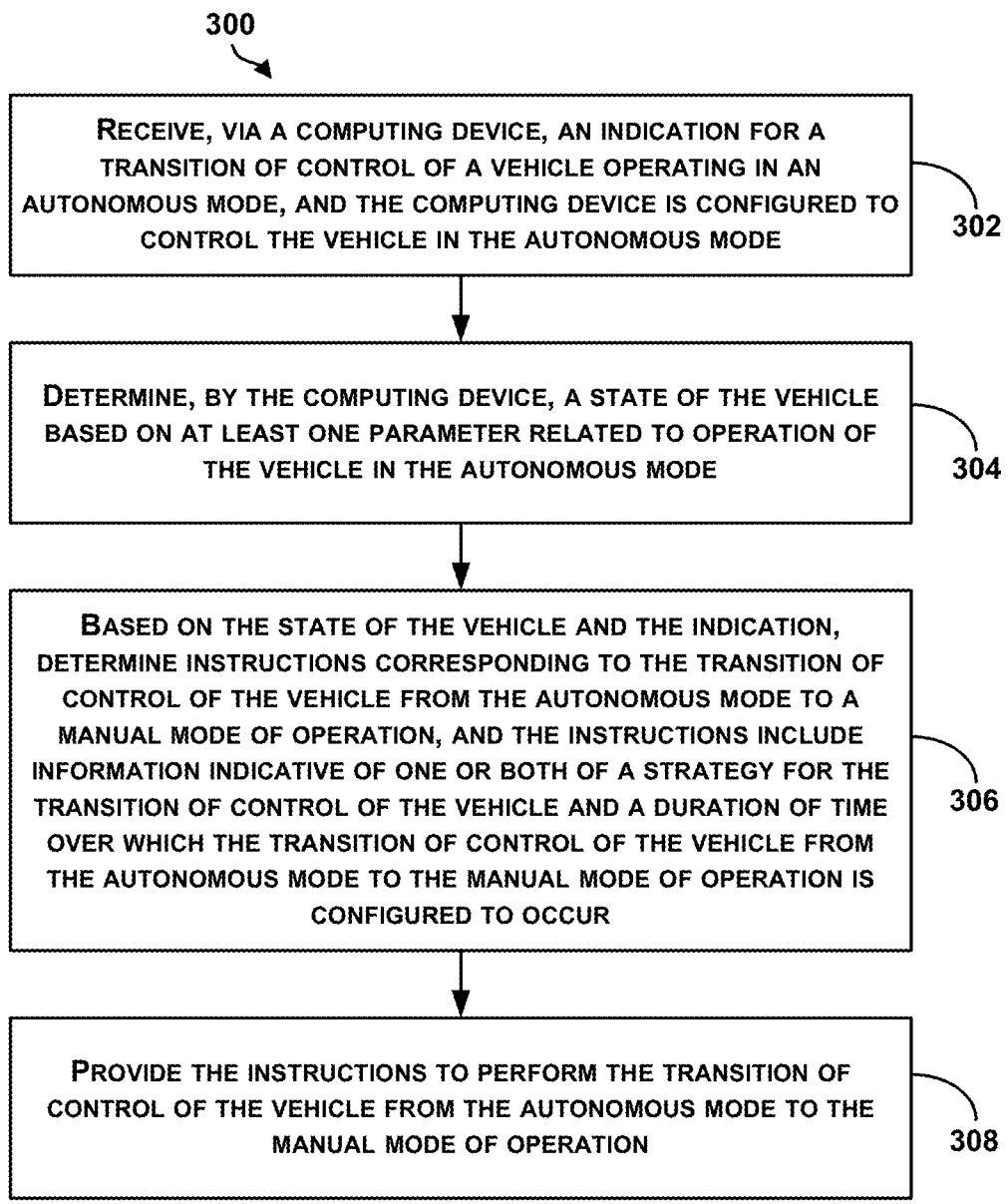
FIG. 3 is a flow chart of an example method for transitioning control of an autonomous vehicle to the driver.

FIG. 3 is a flow chart of a method 300 for transitioning control of an autonomous vehicle to the driver.

The method 300 may include one or more operations, functions, or actions as illustrated by one or more blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 involves receiving, via a computing device, an indication for a transition of control of a vehicle operating in an autonomous mode, and the computing device is configured to control the vehicle in the autonomous mode. A computing device autonomously controlling a vehicle may be configured to continuously monitor for various types of indications from the driver requesting a switch to manual control of the vehicle. The computing device may be configured to detect and receive various indications from the driver, such as manual application of the throttle, brakes, or steering wheel, etc. In one implementation, a vehicle may be configured with a button, switch, or similar interface for receiving an indication from the driver for a transition from autonomous mode to manual mode. Further, a computing device may use various means to detect the indications, including gauges, sensors, or other components.

In addition, a computing device controlling a vehicle in autonomous mode may be configured to determine that a received indication exceeds a threshold to prevent detecting a false indication. For example, the computing device may be configured to determine that a manual change by the driver in the steering system of the vehicle (e.g., turning of the steering wheel) is above a threshold and unrelated to the control of the vehicle in the autonomous mode. The computing device may be configured to prevent transitioning control to the driver in instances that the driver accidently bumped the steering wheel and did not want a transition of control into manual operation mode by using a threshold. Similarly, a computing device may be configured to hand off control to a driver after detecting an application of the braking system of the vehicle by the driver. In some examples, the computing device may require that the pressure applied to the brakes exceeds a threshold or that the overall change of the braking system exceeds a threshold level.

Further, the computing device may be configured to detect a change in the throttle system and determine if the change is representative of an indication from the driver. For example, the computing device may be applying the brakes of the vehicle in autonomous mode and detect that the driver is manually applying the throttle. The computing device may determine that the manual application is an indication for transition control to the driver. Other forms of indication may be detected by the computing device as well.

At block 304, the method 300 further involves determining, by the computing device, a state of the vehicle based on at least one parameter related to operation of the vehicle in the autonomous mode. The computing device may determine various parameters related to the operation of the vehicle in the autonomous mode, such as information associated with the braking system, the steering system, or the throttle system of the vehicle. The information associated with the braking system, steering system, throttle system, and other systems of the vehicle may include the current levels of use, previous actions, or future actions, for example.

Using the parameters, the computing device may determine the state of the vehicle. For example, the computing device may determine the speed of the vehicle or the angle of the steering at that period of time when an indication for handover of control is received from the driver. Similarly, the computing device may determine a combination of the parameters related to the operation of the vehicle in autonomous mode. For example, the computing device may determine the turning radius of the vehicle, and the current state of the throttle system and braking system.

In some instances, the computing device may determine parameters associated with the environment of the vehicle and/or the future state of the vehicle. For example, the computing device may determine travel patterns based on the route, layout of the road, direction of the vehicle, and other factors. The computing device may be configured to use possible future movements or commands that the autonomous vehicle may execute as time progresses. For example, a computing device may determine that the vehicle is about to execute a turn, accelerate, brake, or changing lanes, etc. Further, the computing device may determine that the vehicle is approaching a traffic signal, obstacle, the wanted destination, or other parameters, etc. A computing device may use one or more components associated with the vehicle as discussed in FIG. 1 to determine the various parameters that define the current or future state of operation of the vehicle. Some example components may include a global positioning system (GPS), other computing devices, lasers, image-detecting devices, radar, sensors, gauges, or other components.

In some examples, the parameters that are determined can be processed to determine the state of the vehicle, and the state of the vehicle may include states such as a state in which transition of control to a driver is acceptable, or a state in which transition of control to the driver is not acceptable or not recommended.

At block 306, the method 300 involves based on the state of the vehicle and the indication, determining instructions corresponding to the transition of control of the vehicle from the autonomous mode to a manual mode of operation, and the instructions include one or both of a strategy for the transition of control of the vehicle and a duration of time corresponding to the transition of control of the vehicle from the autonomous mode to the manual mode of operation. The computing device may determine instructions to use for the transition of the vehicle from autonomous mode to manual mode. Further, the computing device may determine the instructions factoring in the state of the vehicle, travel patterns, type of indication received from the driver, and/or other information.

The instructions may include a strategy that defines how to transition control of the vehicle to the driver. The computing device may be configured to determine a particular strategy that executes the transition between autonomous modes to manual or semi-manual mode efficiently. The various strategies used may be determined by the computing device based on the state of the vehicle operating autonomously, the indication received from the driver, the previous and possible future travel patterns, and/or additional factors. The computing device may select strategies based on providing an efficient and safe transition of control of the vehicle to the driver. In some examples, the computing device may use one or more algorithms to use to determine the particular strategy to use based on some or all of the possible variables that are involved with the vehicle operating autonomously.

In example strategies, the computing device may transition complete control of the vehicle to the driver immediately or may transition various systems separately to the driver. In some instances, the computing device may determine that a particular strategy for transitioning control to the driver may work more efficiently than other strategies. The computing device may determine that slowly executing the transition through using a semi-manual mode may be the most efficient means for transitioning the control over to the driver based on the indication type received and the current state of the vehicle. In other situations, the computing device may determine that an immediate transfer of control may be the most efficient strategy. The computing device may select a strategy that transitions the vehicle systems in a predetermined order.

In addition, the instructions may also include the duration of time for the transition of control to occur as determined by the computing device. The instructions may include a duration of time required by the computing device that includes a delay of the transition. Further, the computing device may determine that performing the transition over a long duration of time may allow the driver to acclimate to the transition of control from autonomous to manual. For example, a computing device may receive an indication and determine that the transition should be performed after executing the upcoming turn according to determined parameters and set the duration of time for the transition from autonomous to manual mode accordingly. The computing device may vary the duration during the transition in cases that the transition of control of all the systems of the vehicle needs to be delayed or sped up. In addition, the computing device may use a duration based on the specific strategy determined for handing over control to the driver.

The computing device controlling the vehicle may determine that the parameters and type of indication may not result in a safe transition to manual mode and not execute the transition in response. For example, the computing device may determine that the vehicle is autonomously driving on a highway at a high speed and receive an indication from the driver through detecting the manual application of force upon the steering wheel. The computing device may determine to not perform the handoff in this situation since the high speed and turning radius applied by the driver may not combine safely. Similarly, the computing device may be applying the brakes to the vehicle in autonomous mode since the vehicle is quickly approaching an obstacle in the road (e.g., stopped vehicle) and receive an indication of the application of the throttle by the driver. The computing device may not perform the transition of control to the driver in this situation to prevent a crash with the upcoming obstacle. Further, the computing device may also delay a handoff of control based on the state of the vehicle and the indication in other examples.

At block 308, the method 300 involves providing the instructions to perform the transition of control of the vehicle from the autonomous mode to the manual mode of operation. The computing device or another entity associated with the vehicle may be configured to use the instructions to perform the transition of control of the vehicle from the autonomous mode to the manual mode of operation. The instructions may be stored in memory or in a cloud, for example.

In some example implementations of method 300, a computing device may be configured to switch between autonomous mode and manual more than once. Further, the computing device may be configured to differentiate steering torque applied by the driver from any mechanical-feedback torque that may be caused from the road through the use of different levels of thresholds. For example, the computing device may be configured to determine the difference between the mechanical-feedback torque resulting from the vehicle hitting a bump during a turn and the application of force on the steering wheel by the driver. In order to determine the difference, the computing device may require a high threshold any indication received from a manual turning the steering wheel. Further, the computing device may be configured to eliminate over-steering through an adaptive strategy in the instructions for the handoff of control. For example, a computing device may use an adaptive strategy to smoothly ramp down the vehicle torque to zero in order to let the driver adapt.

In another example implementation of method 300, a computing device may be in the process of applying brakes and receive an indication from the driver during the application of the brakes in autonomous mode. Depending on the type of indication and the state of the vehicle, the computing device may perform different functions. For example, if the computing device receives an indication through manual application of the steering wheel, the computing device may determine to ramp down the autonomous braking until the vehicle is traveling at a speed in an environment safe for handoff to the driver. In contrast, if the computing device receives an indication through application of the throttle by the driver, the computing device may be configured to release the autonomous braking since the driver is applying the opposite input. Further, the computing device may detect that the driver is applying force to the brakes during the autonomous braking and continue to control the braking system, but increase the braking level until the driver relinquishes force upon the brake manually. Over time, the computing device may ease control of the braking system entirely to the driver when the vehicle is in a state safe for the transition.

In another implementation, the computing device may be autonomously accelerating and detect an indication from the driver for manual control. In this case, the computing may be configured to release the acceleration immediately upon receiving an indication and may transition control to the driver. Similarly, the computing device may retain control of the vehicle. Further, in some instances when the computing device detects the application of the indication interface (e.g., button, switch), the computing device may be configured to transition all the systems of the vehicle to manual mode or may be configured to transition only some of the systems of the vehicle.

Furthermore, in some examples, the computing device may set limits that prevent the handoff of control of the vehicle to the driver from occurring. For example, the computing device may be configured to reject all requests for control from a driver when the vehicle is traveling above a threshold speed or in specific conditions (e.g., heavy rain, snow). The computing device may also factor in the amount of other vehicles, pedestrians, and/or obstacles that are within a threshold vicinity of the vehicle when making a determination on whether to handoff control to the driver or not. Additionally, the computing device may also be configured to always select a longer duration to perform a handoff during certain current states of operation by the vehicle, such as during the performance of a U-turn. Further, the computing device may use a shorter duration for handing over control to the driver. The computing device may be configured to not allow a switch from autonomous mode to manual mode if the computing device determines that one or more components (e.g., sensors) of the vehicle are not properly working and may result in an unsafe transfer of control.

The computing device may be configured to display messages to the driver via various interfaces, such as audio messages/alerts or readable text on a screen. For example, the computing device may determine that performing a transition of control to the driver is temporarily unsafe and explain in the on-screen message the reasoning behind the rejection. Similarly, in some instances, the computing device may cause the seat and/or steering wheel to vibrate to alert the driver of a rejected request for transition of control.

In one example, a computing device may be configured to perform checks on the driver, prior to transitioning control of the vehicle from the computing device to the driver. For example, the computing device may use an image-detecting device to determine if the driver is properly positioned to assume control of the vehicle. Further, the computing device may determine if the driver is in a state capable of controlling the vehicle. For example, the computing device may use sensors or eye detection features to make sure that the driver is alert. Similarly, the computing device may utilize sensors to ensure that a driver has both hands on the steering wheel prior to transitioning control of the vehicle to the driver. The computing device may require other safety factors to be satisfied prior to transitioning control from autonomous mode to manual mode in addition.

In another implementation, a computing device may transition control of the vehicle to a driver and continue to monitor the environment of the vehicle as well as the actions of the driver. The computing device may be configured to assist the driver or even take over complete control of the vehicle in situations that the computing device determines the actions of the driver may result in an accident or harm. For example, the computing device may transition control to a driver in a residential neighborhood, but after the driver continues to accelerate a threshold above the speed limit (e.g., 20 mph over) the computing device may retake command of the vehicle away from the driver. Other examples may exist.

Figure 4A:
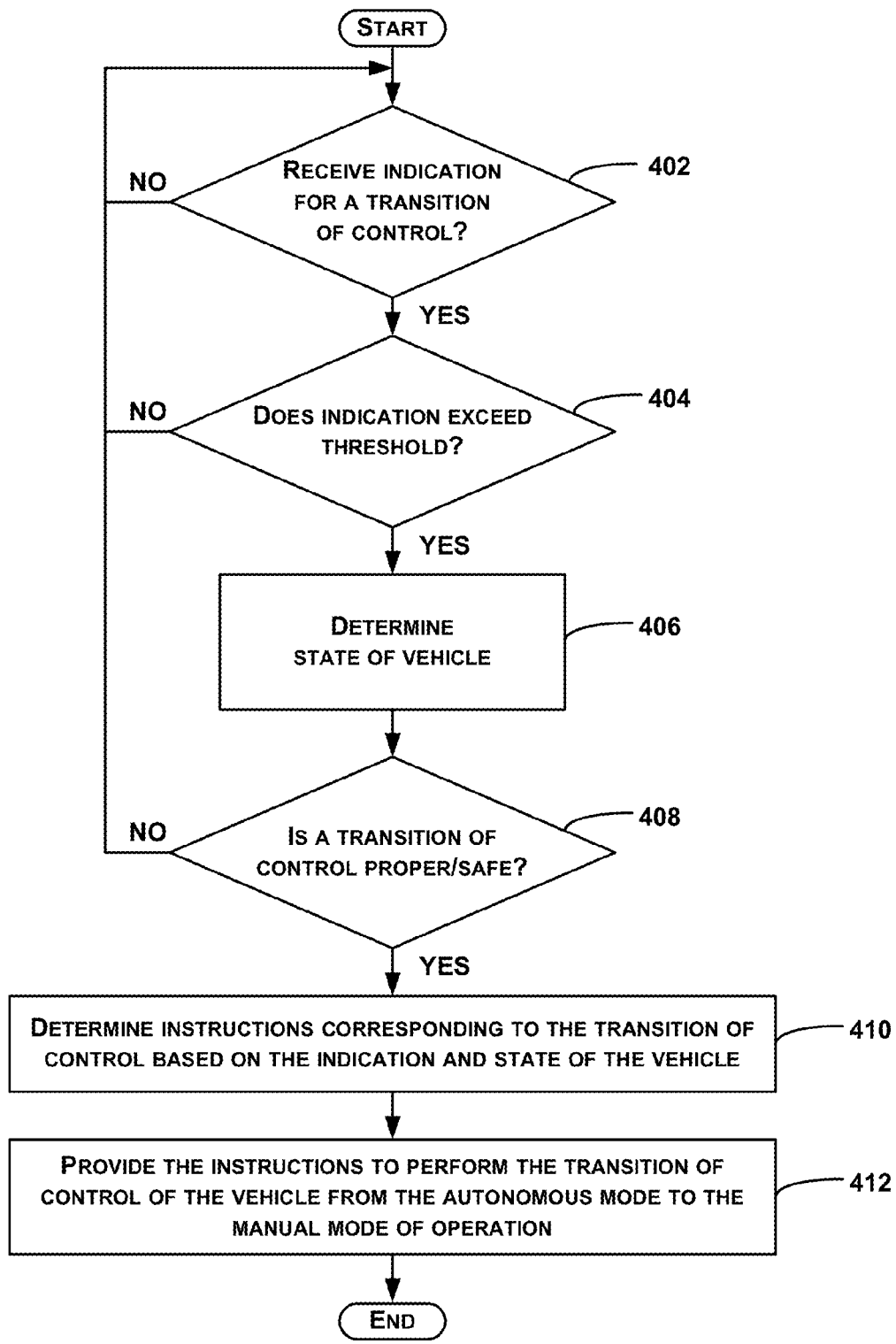
FIGS. 4A-4C are flow charts for an additional example method for transitioning control of an autonomous vehicle to the driver.
Figure 4B:
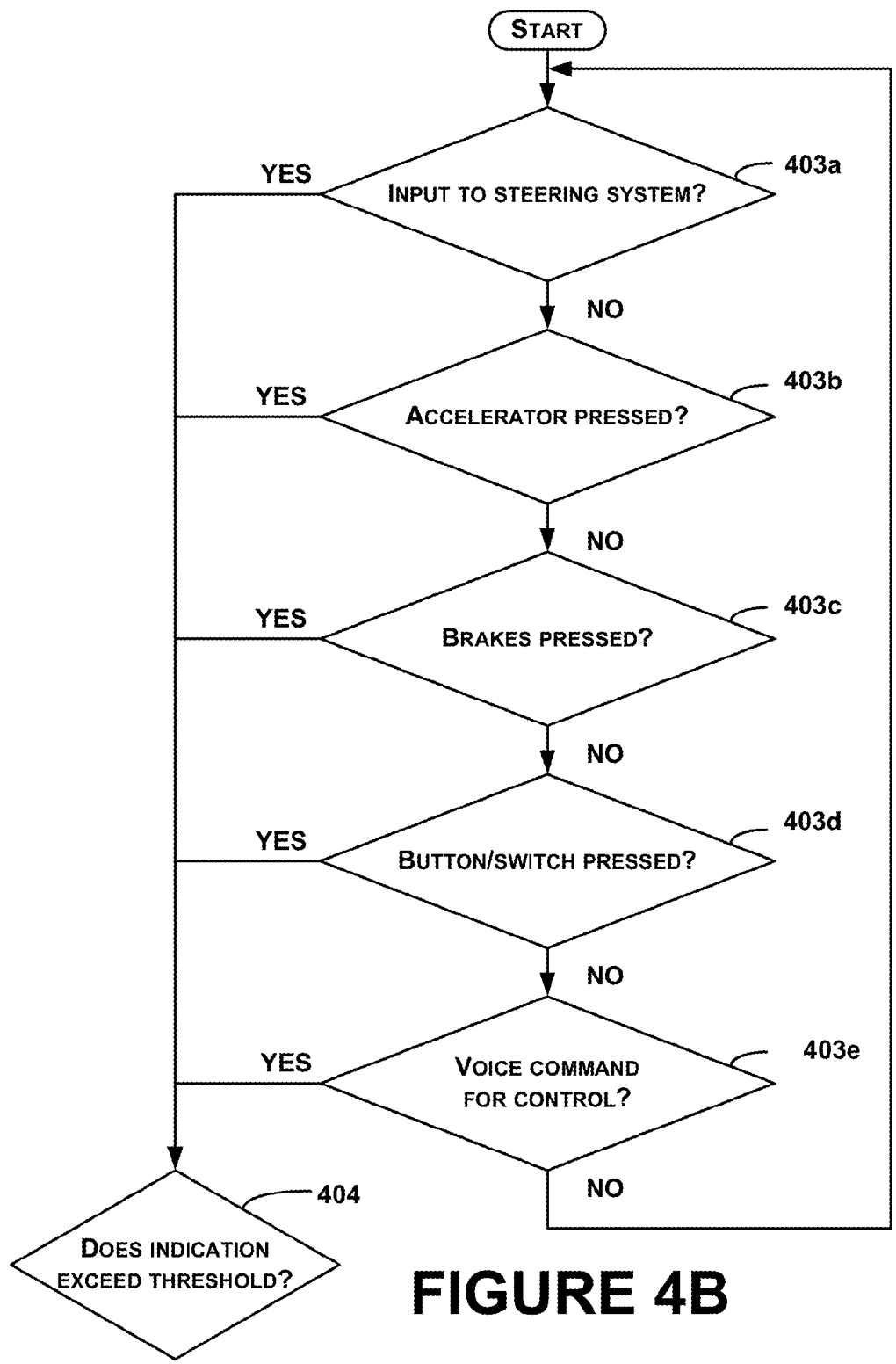
Figure 4C:
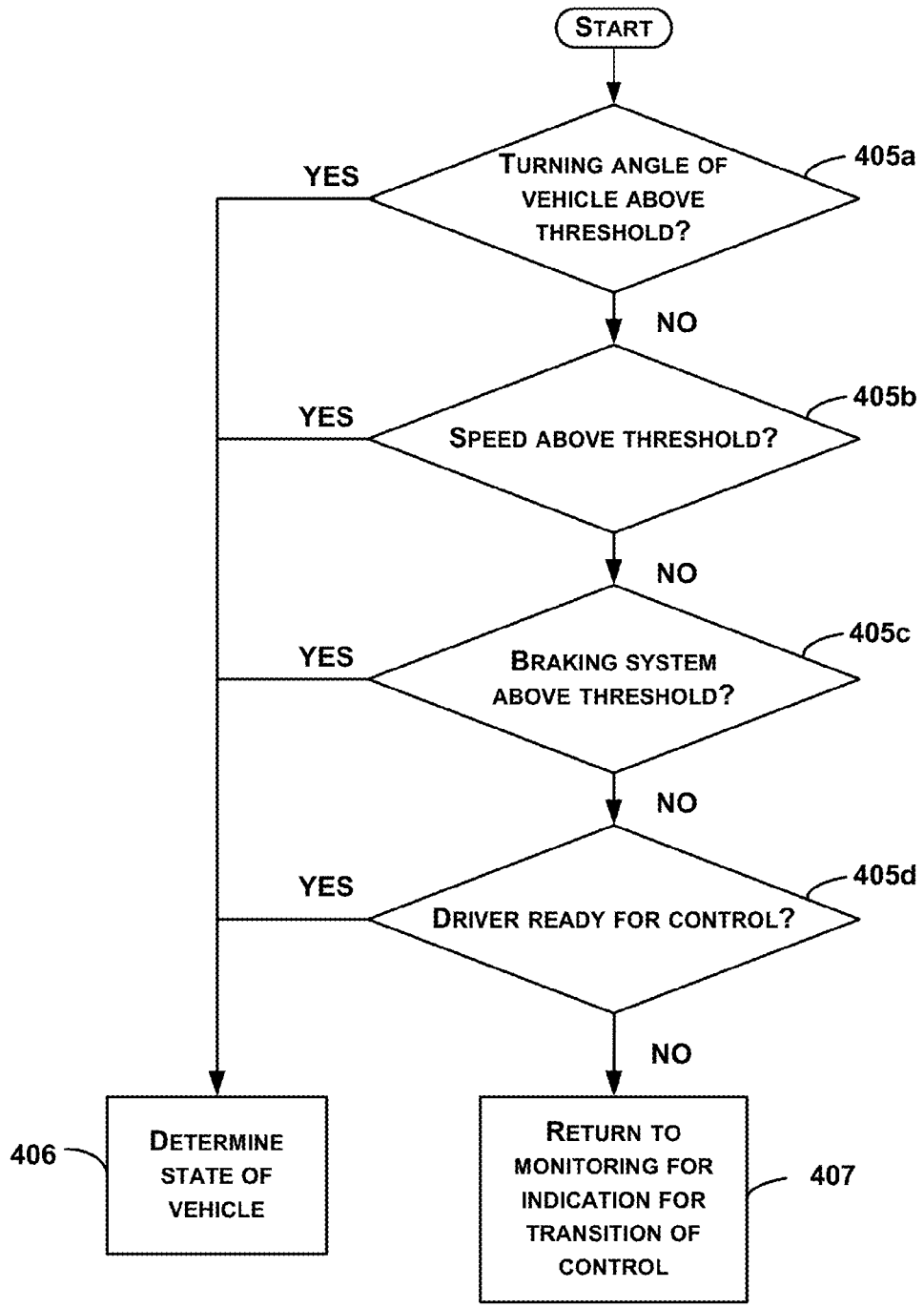

FIGS. 4A-4C show flow charts for an example implementation of a method for transition control of an autonomous vehicle to a driver. FIG. 4A shows an overview of an example implementation of method 300. FIGS. 4B-4C further focus upon portions of the flow chart shown in FIG. 4A. Other examples may exist in addition to the example flow charts within FIGS. 4A-4C.

FIG. 4A shows an example flowchart for performing a method, and may include one or more operations, functions, or actions as illustrated by one or more of the blocks 402-412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method includes receiving an indication for a transition of control. As discussed in FIG. 3, a computing device controlling a vehicle in autonomous mode may be configured to receive an indication for a transition of control from the driver through different indications. FIG. 4B expands upon block 402 shown in FIG. 4A by showing example indications that may be detected by the computing device. Other indications may exist in addition to the indications shown within FIG. 4B. Similar to FIG. 4A, FIG. 4B shows an example flowchart describing ways a computing device may receive an indication for transition of control. A computing device may detect indications in real-time and may also check for a combination of indications through multiple systems in some examples.

At block 403a shown in FIG. 4B, the computing device may be configured to determine if the steering system of the vehicle received any input through manual force to the steering wheel. As discussed in FIG. 3, a computing device may be configured to detect indications from any force that the driver may apply to the steering system. In other examples, the computing device may be configured to check for other indications prior to determining if force has been applied to the steering wheel. Likewise, the computing device may be configured to check multiple systems simultaneously in real-time to determine if the driver has indicated a desire for a transition of control of the vehicle from autonomous mode to manual mode.

At block 403b, the computing device may be configured to detect if the accelerator is pressed. As discussed in FIG. 3, the computing device may receive an indication from the driver through a manual application of the throttle system. The computing device may detect that the driver wants to accelerate the vehicle. In some instances, the computing device may be configured to check the throttle system for any indication prior to the other systems.

At block 403c, the computing device may be configured to detect if the brakes have been pressed. The computing device may sense a physical application of a footbrake, handbrake, etc. from the driver for a possible indication. Similar to the other indications, the computing device may monitor the brake system continuously to enable detection of a manual application.

At block 403d, the computing device may be configured to detect if a button or switch that requests transition for control from autonomous mode to manual mode has been pressed or flipped. As discussed in FIG. 3, the computing device may receive an indication from the driver through a button, switch, or other means.

At block 403e, the computing device may be configured to detect if the driver is requesting control of the vehicle through a voice command. In some examples, the computing device may be configured to detect physical motions of a user, such as a certain hand gesture or symbol requesting control. The computing device may be configured to receive a confirmation from the driver through a voice command.

At any point, the computing device may be configured to check one or more of the systems for indications that may signal that the driver wants control of the vehicle. As shown in FIG. 4B, in the case that the computing device does not receive any indications from the vehicle systems checked, the computing device would continue to control the vehicle in autonomous mode and may continue to monitor for indications from the driver.

In response to detecting an indication from the driver through one or more of the systems of the vehicle, the computing device may be configured to proceed to determine the state of the vehicle, shown as block 404 in FIGS. 4A-4C. As discussed in FIG. 3, the computing device may need to determine the state of the vehicle, which may include parameters related to the operation of the vehicle in autonomous. At this point, the computing device may be configured to determine the speed, environment, levels of systems, or other parameters associated with the vehicle operating in autonomous mode.

At block 404 in FIG. 4A, the computing device determines if the received indication exceeds a threshold. If the computing device determines that the detected indication does not exceed the threshold, the computing device returns to monitoring the system for a new indication from the driver. By using one or more thresholds, a computing device may reduce the number of indications received erroneously.

FIG. 4C further expands upon block 404 of FIG. 4A, showing example thresholds the computing device may use to determine if the detected indication is a true request from the driver for a transition of control from autonomous mode to manual mode. Within FIG. 4C, blocks 405a-405d represent example threshold tests that a computing device may utilize in order to determine whether to proceed in method 300 to transition control of the vehicle or to recognize that the detected indication may have resulted from error. A computing device may be configured to perform each threshold tests regardless of the type of indication detected or may focus upon a threshold test based on the indication. Similarly, the computing device may be configured to determine a combination of levels relative to expected thresholds amounts that may be changed according to driving conditions, by the computing device, or manually by the driver. The thresholds may vary or may be predefined and multiple thresholds may be applied.

As shown at block 404 of FIG. 4A and further expanded in FIG. 4C, the computing device controlling the vehicle may be configured to determine if the detected indication is an actual indication given by the driver requesting control.

At block 405*a*, the computing device may be configured to determine if the turning angle of the vehicle is above a threshold. For instance, a computing device may determine the current turning angle of the vehicle and/or determine if the force applied to the steering wheel by the driver exceeds a threshold. By using a threshold, the computing device may ensure that the force applied to the steering system was a result of the driver requesting control and not from hitting a bump in the road or the driver accidentally bumping the steering wheel, for example. As discussed in FIG. 3, the computing device may require that force applied to the steering system by the driver exceeds a threshold to prevent initiating an unwanted transition from autonomous mode to manual mode.

At block 405*b*, the computing device may be configured to determine if the speed of the vehicle traveling autonomously is above a threshold. The computing device may determine if the speed is above a threshold prior to checking other systems. Similarly, the computing device may determine if the amount of force applied to the throttle system by the driver exceeds a threshold in order to ensure that the transition is wanted.

At block 405*c*, the computing device may be configured to determine if the braking system exceeds one or more thresholds. The computing system may be configured to check if the force applied manually to the brake system exceeds a threshold in order to determine if the computing device received a proper indication.

At block 405*d*, the computing device may determine if the driver is ready for a transition of control from autonomous mode to manual mode. The computing device may use features as discussed in FIG. 3 to determine if the driver is ready for a transition of control.

In the case that the computing device determines that one or more of the thresholds are met indicating that the detected indication is an actual request from the driver for manual mode, the computing device may proceed to block 406 of FIGS. 4A-4C to determine the state of the vehicle. If the detected indications do not exceed a threshold, the computing device may be configured to return to monitoring for new indications from the driver as shown at block 407 in FIG. 4C.

Referring back to FIG. 4A, the computing device may proceed to determine the state of the vehicle operating in autonomous mode if the detected indication exceeds any threshold tests applied by the computing device.

At block 406, the computing device may determine the state of the vehicle, including parameters relating to the speed, environment, levels of the systems of vehicle, etc. while operating in autonomous mode. As discussed in FIG. 3, the computing device may determine multiple parameters relating to the transition of the vehicle from autonomous mode to manual mode.

At block 408, the computing device may be configured to determine if a transition of control over to the driver is proper and/or safe. The computing device may be configured to determine if the state of the vehicle and the type of indication may permit a safe transition. Similarly, the computing device may determine that the vehicle is not currently in a safe environment for allowing a transition of control. In the case that the computing device determines a transition is unsafe or not proper, the computing device may ignore the indication requesting the transition and return to monitoring the systems while maintaining control of the vehicle. In some instances, the computing device may delay the transition for a period of time until the computing device determines that the transition is safe and/or proper. If the computing device determines the transition is safe/proper, the computing device may proceed to determine instructions corresponding to the transition of control based on the indication and state of the vehicle.

At block 410, the computing device may determine the instructions corresponding to the transition of control based on the indication and state of the vehicle. The computing device may determine instructions based on only the indication, only the state of vehicle, or a combination. In addition, the computing device may use other factors to determine the instructions as further discussed above in FIG. 3.

At block 412, the computing device may provide the instructions to perform the transition of control of the vehicle from the autonomous mode to the manual mode of operation as discussed in FIG. 3.

Other adaptive strategies and durations are possible, including various combinations of the handoffs discussed above. The strategies may be implemented in autonomous and semi-autonomous vehicles, depending on the state of the vehicle and/or types of indication received. The method discussed herein may include variations, and may be performed for different types of vehicles or other entities.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
operating, by a computing system, a vehicle in an autonomous mode, wherein a steering wheel is substantially disengaged from manual control of a steering system of the vehicle; receiving, by the computing system, an engage signal corresponding to at least a threshold change in torque applied to the steering wheel;
determining a vehicle state upon receiving the engage signal, wherein the vehicle state includes an indication of a speed of the vehicle; based at least in part on the vehicle state, determining a transition period to transition the vehicle from the autonomous mode to a manual mode, wherein the determined transition period is a duration of time from when the computing system begins to decrease torque applied to the steering system by the autonomous control process to when the transition to a manual control of the steering system is complete;
decreasing, over the transition period, torque applied to the steering system by an autonomous control process at a rate based on the speed of the vehicle; and
by the end of the transition period, completing the transition from the autonomous mode to a manual mode by engaging the steering wheel to allow manual control the steering system and ceasing use of the autonomous control process.

2. The method of claim 1, wherein the threshold change in torque is further based on a speed of the vehicle.

3. The method of claim 1, wherein the vehicle state further comprises an indication of an orientation and an acceleration of the vehicle.

4. The method of claim 1, wherein based at least in part on the vehicle state, determining a transition period to transition the vehicle from the autonomous mode to a manual mode comprises: responsive to determining that the vehicle is traveling at a speed below a threshold level, determining a transition period below a predefined duration of time.

5. The method of claim 1, wherein engaging the steering wheel to control the steering system comprises: determining whether engaging the steering wheel to control the steering system fulfills one or more conditions, wherein the one or more conditions includes determining a control of the steering wheel; and responsive to determining that engaging the steering wheel to control the steering system fulfills the one or more conditions, engaging the steering wheel to control the steering system.

6. The method of claim 1, wherein, by the end of the transition period, engaging the steering wheel to control the steering system to transition the vehicle from the autonomous mode to the manual mode comprises: transitioning respective systems of the vehicle operating in the autonomous mode at different times to the manual mode.

7. A system comprising:
at least one processor; and
a memory having stored thereon executable instructions that, upon execution by the at least one processor, cause the system to perform functions comprising:
operating a vehicle in an autonomous mode, wherein a steering wheel is substantially disengaged from manual control of a steering system of the vehicle;
receiving an engage signal corresponding to at least a threshold change in torque applied to the steering wheel; determining a vehicle state upon receiving the engage signal, wherein the vehicle state includes an indication of a speed of the vehicle;
based at least in part on the vehicle state, determining a transition period to transition the vehicle from the autonomous mode to a manual mode, wherein the determined transition period is a duration of time from when the system begins to decrease torque applied to the steering system by the autonomous control process to when the transition to a manual control of the steering system is complete;
decreasing, over the transition period, torque applied to the steering system by an autonomous control process at a rate based on the speed of the vehicle; and
by the end of the transition period, completing the transition from the autonomous mode to a manual mode by engaging the steering wheel to allow manual control of the steering system and ceasing use of the autonomous control process.

8. The system of claim 7, wherein the threshold change in torque is further based on a speed of the vehicle.

9. The system of claim 7, wherein the vehicle state further comprises an indication of an orientation and an acceleration of the vehicle.

10. The system of claim 7, wherein based at least in part on the vehicle state, determining the transition period to transition the vehicle from the autonomous mode to the manual mode comprises: responsive to determining that the vehicle is traveling at a speed above a threshold level, determining a given transition period above a predefined duration of time.

11. The system of claim 7, wherein, by the end of the transition period, engaging the steering wheel to control the steering system to transition the vehicle from the autonomous mode to a manual mode comprises: determining whether engaging the steering wheel to control the steering system fulfills one or more conditions, wherein the one or more conditions includes determining a control of the steering wheel; and responsive to determining that engaging the steering wheel to control the steering system fulfills the one or more conditions, engaging the steering wheel to control the steering system.

12. A non-transitory computer readable medium having stored thereon executable instructions that, upon execution by a computing device, cause the computing device to perform functions comprising:
operating a vehicle in an autonomous mode, wherein a steering wheel is substantially disengaged from manual control of a steering system of the vehicle;
receiving an engage signal corresponding to at least a threshold change in torque applied to the steering wheel;
determining a vehicle state upon receiving the engage signal, wherein the vehicle state includes an indication of a speed of the vehicle;
selecting a preferred transition strategy from a plurality of transition strategies, based on the vehicle state, to transition the vehicle from the autonomous mode to a manual mode, by following at least the following requirements of the plurality of transition strategies including:
(a) determining a transition period based, at least in part, on the speed of the vehicle, wherein the determined transition period is a duration of time from when the computing system begins to decrease torque applied to the steering system by the autonomous control process to when the transition to a manual control of the steering system is complete;
(b) decreasing, over the transition period, torque applied to the steering system by an autonomous control process at a rate based on the speed of the vehicle; and
(c) by the end of the transition period, completing the transition from the autonomous mode to a manual mode by engaging the steering wheel to allow manual control of the steering system;
executing the preferred transition strategy and ceasing use of the autonomous control process.

13. The non-transitory computer readable medium of claim 12, wherein the threshold change in torque is further based on a speed of the vehicle.

14. The non-transitory computer readable medium of claim 12, wherein the vehicle state further comprises an indication of an orientation and an acceleration of the vehicle.

15. The non-transitory computer readable medium of claim 12, wherein the plurality of transition strategies comprises respective transition strategies that correspond to given engage signals.

16. The non-transitory computer readable medium of claim 12, wherein engaging the steering wheel to control the steering system comprises: determining whether engaging the steering wheel to control the steering system fulfills one or more conditions, wherein the one or more conditions includes determining a control of the steering wheel; and responsive to determining that engaging the steering wheel to control the steering system fulfills the one or more conditions, engaging the steering wheel to control the steering system.

17. The non-transitory computer readable medium of claim 12, wherein executing, by the computing system, the preferred transition strategy to transition the vehicle from the autonomous mode to a manual mode comprises: transitioning respective systems of the vehicle operating in the autonomous mode at different times to the manual mode.

* * * * *